Aug. 28, 1962 F. W. ROBERTS ET AL 3,051,795
FAILURE DETECTING AND INDICATING MEANS FOR SOUND RECORDING SYSTEMS
Filed March 31, 1959
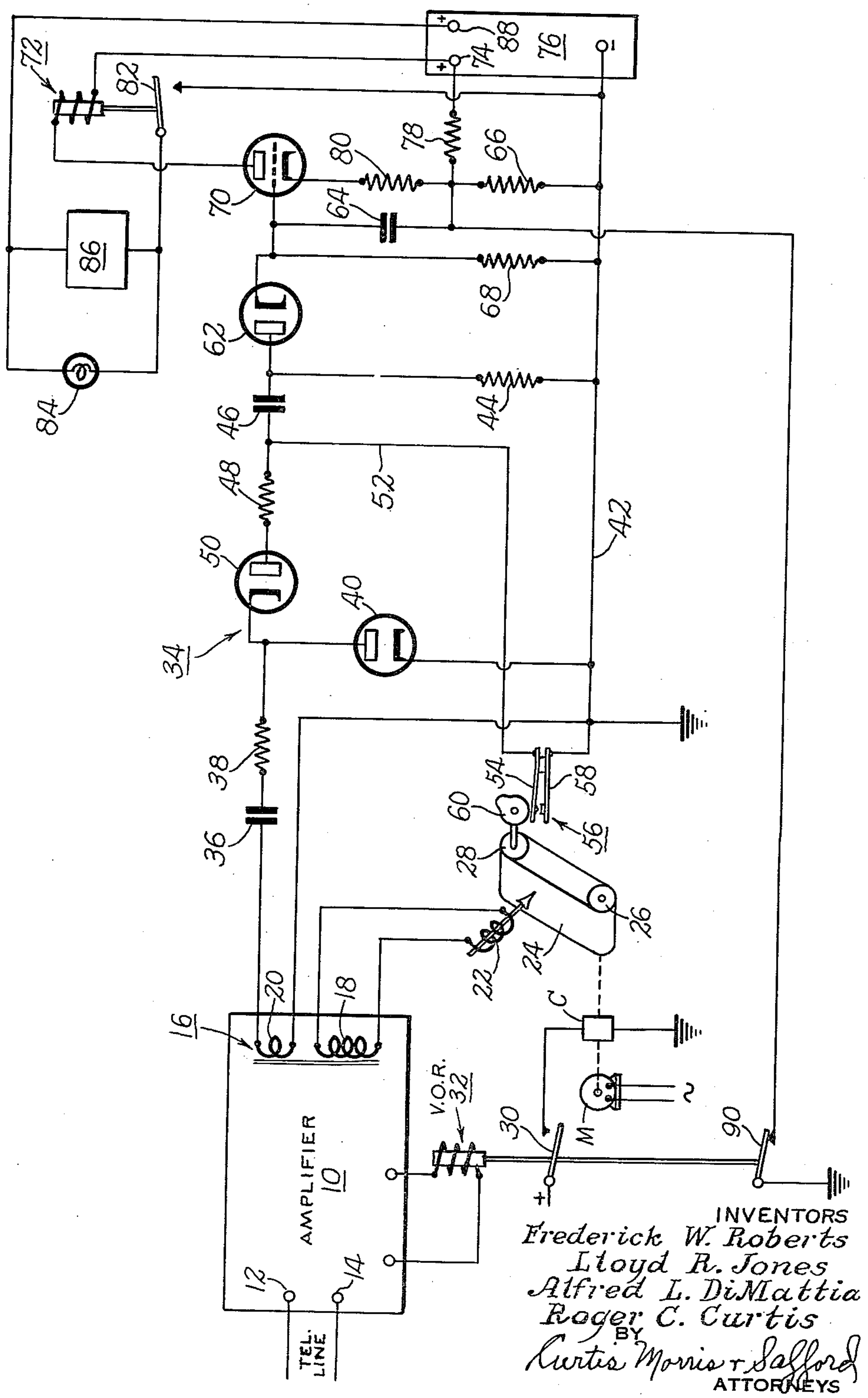
INVENTORS
Frederick W. Roberts
Lloyd R. Jones
Alfred L. DiMattia
Roger C. Curtis
BY
Curtis Morris & Safford
ATTORNEYS United States Patent Office 3,051,795
Patented Aug. 28, 1962

3,051,795

FAILURE DETECTING AND INDICATING MEANS FOR SOUND RECORDING SYSTEMS

Frederick W. Roberts, Fairfield, Lloyd R. Jones, Monroe, Alfred L. Di Mattia, Fairfield, and Roger C. Curtis, New Haven, Conn., assignors to Dictaphone Corporation, Bridgeport, Conn., a corporation of New York Filed Mar. 31, 1959, Ser. No. 803,257
8 Claims. (Cl. 179—100.1)

This invention relates to sound recording systems such as remote-dictation systems, or automatic telephone-answering systems of the type which include means for recording an incoming message during the absence of the called party. More in particular, this invention relates to apparatus for developing a warning indication, e.g., in the form of a signal transmitted to the dictator or an attendant at the sound recording equipment, whenever a failure in the sound recording system is preventing the dictated message from being properly placed on the sound record.

In many conventional sound recording or dictating systems, the dictator cannot readily determine whether the system is operating properly, i.e., whether the spoken message is actually being placed on the record. This is particularly so in the case of remotely-operated recording machines, such as frequently are used with telephone-answering apparatus, wherein the operation of the machine cannot be observed by the speaking, or calling, party. If the calling party is unaware of a failure in the recording system, he not only will waste time in continuing to dictate his message, but in addition such a failure can have serious consequences when the calling party erroneously assumes that the message was received by the called party.

One approach to this problem is to provide at the recording machine a separate additional reproducing head which constantly senses the sound impressions immediately after they are placed on the record by the recording head. The audio output signals of this reproducing head could then be intensified, as by means of an electronic amplifier, to a power level suitable for actuating a "voice-operated relay" of usual construction. In the event of a failure in the recording system, the audio signals from the reproducing head would cease, and the voice-operated relay would drop out. By arranging this relay in such a manner that, when it drops out, current is automatically supplied to an indicator lamp or other warning device (e.g. a tone generator arranged to feed an audible signal to the calling party), the dictator or an attendant at the recording machine could be alerted to the fact that the message was not being recorded.

This approach, although theoretically workable, is unsatisfactory in a number of applications. For example, such a failure-warning arrangement requires a substantial amount of complex equipment that would in many instances be prohibitively expensive for the function performed. Moreover, because of the complexity of such equipment, it would not likely be substantially more reliable than the components of the sound recording system, and thus might at times itself fail and produce a warning indication when the sound recording equipment actually was functioning properly. In that event, of course, much valuable operating time of the recording equipment would needlessly be lost.

In a preferred embodiment of the invention, to be described hereinbelow in detail, there is provided a simple and reliable arrangement wherein a warning is given to the dictator (or an attendant) if sound signals are not being fed to the recording head during dictation, or if the sound record is not moving. This approach is based on the concept that modern-day recording heads are highly rugged components that virtually never fail, and thus a continuous check on the audio signal and the record movement will be effectively as indicative of system operation as a check by means of a separate reproducing head, amplifier and voice-operated relay. By this approach, moreover, the failure-warning equipment requires fewer parts, and these parts may be simple and rugged in construction so as to assure a higher reliability than in the more complex warning system previously referred to.

Accordingly, it is an object of this invention to provide improved apparatus for automatically producing a warning indication when a failure has occurred in an associated sound recording equipment. Another object of this invention is to provide such apparatus that is simple and economical to construct, and that is reliable in operation. Other objects of this invention will in part be pointed out in, and in part apparent from, the following description considered together with the drawing which is a schematic and pictorial diagram of a preferred embodiment of the invention.

In the upper left-hand corner of the drawing, there is shown in block form an amplifier 10 having a pair of input terminals 12, 14 adapted to be connected to a telephone or other voice-transmission line carrying sound signals to be placed on a sound record. The details of this amplifier are not shown since conventional audio amplifying apparatus intended for sound recording purposes will suffice. The output circuit of the amplifier includes a transformer 16 having secondary and tertiary windings 18, 20. Winding 18 feeds the amplified sound signals to a recording head 22 which is engaged with a sound record 24 of the belt type. This record is supported for rotary movement by a drive mandrel 26 and an idler mandrel 28.

Drive mandrel 26 is mechanically coupled through a clutch C to the shaft of an electric motor M. The clutch is of usual construction and includes a solenoid which, when energized by current flowing through contacts 30 of a voice-operated relay generally indicated at 32, actuates the clutch drive elements. Voice-operated relay 32 is energized whenever speech signals are transmitted to the amplifier 10, so that the clutch rotates the record 24 only during actual dictation; further details of such a clutch-control relay arrangement are given in U.S. Patent 2,833,860. The amplifier 10 also may include special delaying means, such as described in that patent, to delay the sound signals fed to the recording head 22 so as to assure that the record will have reached proper operating speed when these signals are recorded.

In order to detect whether speech signals actually are being fed to the recording head 22, transformer 16 also is coupled, by its winding 20, to a failure-warning arrangement the first stage of which comprises a rectifying and voltage-doubling circuit generally indicated at 34. In this circuit, the positive-going swings of the audio signal from the transformer produce a flow of current through a capacitor 36 (.47 mf.), a resistor 38 (47,000 ohms) and a diode 40. Thus capacitor 36 is charged up an amount corresponding to the magnitude of these positive-going swings. During the negative-going swings of the audio signal, current flows from the transformer winding 20 through ground lead 42, resistor 44 (47,000 ohms), capacitor 46 (1 mf.), another resistor 48 (47,000 ohms), a second diode 50, resistor 38, and capacitor 36. This current is augmented by the charge previously built up on capacitor 36, and produces on capacitor 46 a D.-C. voltage effectively corresponding to the peak-to-peak voltage swings of the audio signals which are fed from the transformer 16 to the recording head 22.

The left-hand plate of capacitor 46 is connected through a lead 52 to record-motion-responsive means comprising a movable contact 54 of a chopper switch 56. This movable contact is periodically driven into engagement with a fixed contact 58 by means of a cam 60 rotated by idler mandrel 28. The fixed contact 58 is connected to ground lead 42 and establishes a discharge circuit for capacitor 46 once each time the idler mandrel is revolved by record 24. This discharge circuit may be traced from capacitor 46, through a third diode 62, a capacitor 64 (1 mf.) and a resistor 66 (660 ohms) back to ground. As long as the record 24 moves (and thereby rotates the idler mandrel), the chopper switch periodically furnishes to capacitor 64 a charge corresponding to the D.-C. voltage on capacitor 46.

When capacitor 64 has been charged up by capacitor 46, the subsequent opening of chopper switch contacts 54, 58 permits capacitor 64 to slowly discharge through resistor 66 and another resistor 68 (1 megohm). This latter resistor has an ohmic resistance sufficiently large that capacitor 64 will not be completely discharged when contacts 54, 58 again close, providing idler mandrel 28 is rotating at proper speed. Thus, in normal operation this portion of the circuit in effect serves to modulate the D.-C. voltage on capacitor 46, i.e. by producing across capacitor 64 a voltage which varies periodically with an amplitude corresponding to the D.C. voltage across capacitor 46 and at a frequency corresponding to the rate of movement of the record 24.

This varying voltage is fed as a control signal to a sensing circuit comprising a triode tube 70 the plate of which is connected to the winding of a failure relay 72. This sensing circuit is so arranged that the relay will be maintained energized as long as the varying control signal does not drop below a predetermined level, i.e. as long as the voice signals at transformer 16 are of normal intensity and record 24 is moving at correct speed past the recording head 22. In effect, this sensing circuit, in conjunction with the chopper-modulating means previously described, operates as a frequency-sensitive means in that the relay will drop out if the frequency of modulation falls below a predetermined level.

The current for the winding of failure relay 72 is furnished by the positive terminal 74 (100 volts) of a D.-C. power supply generally indicated at 76, and this positive terminal also provides a bias voltage for the tube 70 by means of the connection through a resistor 78 (15,000 ohms) to the top of resistor 66. The junction between these latter two resistors thus is maintained at about 4 volts, and this junction is connected through a resistor 80 (100 ohms) to the cathode of tube 70. This cathode biasing is just sufficient to prevent tube 70 from actuating relay 72 until a control signal of proper magnitude appears across capacitor 64.

If the audio signals from input terminals 12, 14 fail to reach transformer 16, e.g. due to a breakdown in amplifier 10 or other portions of the voice-transmission channel, the rectifier circuit 34 will not charge up capacitor 46. Therefore no control signal will appear on capacitor 64 and the failure relay 72 will remain deactuated.

On the other hand, if for example the motor M or the clutch C fail, or if the attendant has neglected to place a record 24 on the mandrels 26, 28, then the idler mandrel 28 will not rotate and hence there will be no intermittent closure of the contacts 54, 58. Thus, there will be no periodic transfer of charge from capacitor 46 to capacitor 64, and relay 72 again will remain deactuated.

Similarly, if the record slips and does not rotate mandrel 28 at proper speed, capacitor 64 will discharge sufficiently between each operation of switch 56 to permit relay 72 to drop out intermittently. In the specific embodiment disclosed herein, the sensing circuit is so arranged that capacitor 64 takes about 1.5 seconds to discharge to the point where relay 72 is deactuated; thus if idler mandrel 28 is rotating at a speed below about two-thirds of a revolution/second, the relay will periodically drop out.

When the failure relay 72 drops out, it contacts 82 close to complete an energizing circuit to a pair of failure-warning devices schematically indicated as an electric lamp 84 and an electronic tone-producing unit 86, although other types of warning devices might well be used. The power for energizing these latter devices is furnished by another positive terminal 88 of the power supply 76. The lamp 84 is located adjacent the sound recording equipment so as to be visible to the attendant assigned to service this equipment, and when energized will signify to the attendant that a fault in the equipment must be repaired. The tone producing unit 86 is arranged to produce an electrical tone signal which is coupled (by conventional means not shown herein) to the telephone or other transmission line connected to the amplifier input terminals 12, 14, so as to send the dictator an audible warning indication that a failure has occurred in the sound recording system. The dictator thus will stop dictation until repairs have been effected.

Since the speech signals in transformer 16 will cease whenever the dictator pauses in his dictation, the control signal on capacitor 64 will diminish in magnitude during such pauses, possibly to a level permitting relay 72 to drop out. Consequently, means preferably should be provided to prevent any warning indication being sent to the dictator or attendant in such circumstances. For this purpose, the voice-operated relay 32 is provided with an additional set of contacts 90 which, when this relay drops out during pauses in dictation, shorts resistor 66 to ground. The potential on the cathode of tube 70 thus is shifted negatively by several volts, which is sufficient to produce a flow of current through the tube to hold relay 72 actuated and failure-warning devices 84, 86 de-energized. It will also be apparent that this cut-out arrangement prevents energization of the warning devices when the sound recording equipment is not in use, and thus eliminates the need for additional equipment for this purpose.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. For use with remotely-operated sound recording systems and the like, wherein the recording equipment is of the type which includes a recording head and a motor drive mechanism adapted to produce relative scanning movement between said recording head and a sound record cooperable therewith, and wherein said sound record is arranged to receive impressions from said recording head in accordance with sound signals fed to the recording head from a signal-supplying device such as a microphone or the like; apparatus for producing a visible or audible indication to warn of a failure in the sound recording equipment which comprises: circuit means coupled to the output of said signal-supplying device for developing an output voltage in accordance with sound signals being fed from said signal-supplying device to said recording head; motion-responsive means coupled to said drive mechanism and including means to produce an electrical signal having a characteristic that varies in response to changes in the rate of movement of the record relative to said recording head; and sensing means coupled to both said circuit means and said motion-responsive means, said sensing means including means to produce a warning indication either when said output voltage falls below a predetermined level or when said characteristic of said electrical signal corresponds to a rate of movement of said record relative to said recording head that is inadequate to produce proper recording of sound signals fed to the recording head.

2. In sound recording equipment of the type including a recording head and a driving mechanism to produce relative movement between said head and a sound record cooperable therewith, and wherein said sound record is adapted to receive impressions from said recording head in accordance with sound signals fed to the head from a signal-supplying device such as a microphone or the like; that improvement in apparatus for producing a visible or audible indication to warn of a malfunction in the sound recording equipment which comprises: circuit means coupled to the output of said signal-supplying device for producing a D.-C. voltage in accordance with the sound signals being fed from said signal-supplying device to said recording head; modulating means coupled to the output of said circuit means to produce a varying control signal corresponding in amplitude to said D.-C. voltage, said modulating means including means responsive to relative movement between said record and said recording head and operable to vary said control signal in accordance with the rate of said relative movement; and sensing means coupled to the output of said modulating means and responsive to the variations in said control signal, said sensing means including means to produce a warning indication when either the magnitude or the modulation of said control signal changes as a result of, respectively, diminution of the sound signals fed to said recording head or improper movement of said record relative to said head.

3. Apparatus as claimed in claim 2, wherein said sound recording equipment includes a clutch arranged to transmit motion from said driving mechanism to said record, a voice-operated relay coupled to said signal-supplying device to actuate said clutch when a dictator is speaking, and switch means under the control of said voice-operated relay, said switch means being coupled to said sensing means to disable said sensing means during the times when said voice-operated relay is deenergized, whereby no indication of equipment failure is given during normal pauses in dictation.

4. In sound recording equipment of the type including a recording head and drive motor to produce relative movement between said head and a sound record cooperable therewith, and wherein said sound record is adapted to receive impressions from said recording head in accordance with sound signals fed to the head from a signal-supplying device such as a microphone or the like; that improvement in apparatus for producing a visible or audible indication to warn of a malfunction in the sound recording equipment which comprises: a rectifier coupled to said recording head for producing a D.-C. voltage having a magnitude corresponding to the amplitude of sound signals being fed thereto from said signal-suppling device; modulating means comprising a circuit interruptor responsive to relative movement between said record and said recording head and coupled to the output of said rectifier to produce a pulsating control signal corresponding in amplitude to the magnitude of said D.-C. voltage, said modulating means also including means operable to vary the magnitude of the pulsations of said control signal in accordance with the rate of said relative movement; and sensing means coupled to the output of said modulating means and responsive to variations in said control signal, said sensing means including means to produce a warning indication when either the magnitude or the modulation of said control signal changes as a result, respectively, of diminution of the sound signals fed to said recording head or improper movement of said record relative to said head.

5. In sound recording equipment of the type including a recording head and a driving mechanism to produce relative movement between said head and a sound record cooperable therewith, and wherein said sound record is adapted to receive impressions from said recording head in accordance with sound signals fed to the head from a signal-supplying device such as a microphone or the like; that improvement in apparatus for producing a visible or audible indication to warn of a malfunction in the sound recording equipment which comprises: a rectifying circuit coupled to said recording head to produce a D.-C. voltage having a magnitude proportional to the amplitude of sound signals being fed to said recording head; a chopper device coupled to the output of said circuit means to produce an alternating control signal corresponding in amplitude to the magnitude of said D.-C. voltage, said chopper device being responsive to relative movement between said record and said recording head so that the frequency of said control signal corresponds to the speed of said relative movement; and sensing means coupled to the output of said chopper device to receive said alternating control signal, said sensing means including means responsive to the magnitude and frequency of said control signal and arranged to produce a warning indication when either the magnitude or the frequency of said control signal drops below predetermined levels, due to loss of sound signals fed to said recording head or due to insufficient speed of movement of said record relative to said head.

6. In sound recording equipment of the type described, a movably-mounted sound record, a recording head mounted adjacent said record to place sound impressions thereon, a drive motor arranged to move said record past recording head, a rectifying circuit coupled to said recording head, a first capacitor forming part of said rectifying circuit and arranged to develop a D.-C. voltage in accordance with the sound signals fed to said recording head, a chopper switch connected to said first capacitor, said switch being mechanically coupled to said record to be operated in accordance with the speed of record movement, a second capacitor connected to said chopper switch to receive a charge from said first capacitor whenever said chopper switch is closed, a voltage-sensing device coupled to said second capacitor and operable when the voltage across said second capacitor drops below a predetermined level; and a failure-indicating device under the control of said voltage-sensing device, said failure-indicating device being energized in response to operation of said voltage-sensing device.

7. Apparatus as claimed in claim 6, wherein said record comprises a flexible belt mounted on a drive mandrel and an idler mandrel, and drive means coupled to said idler mandrel to actuate said chopper switch.

8. Apparatus as claimed in claim 6, wherein said voltage-sensing means comprises a current-control device, and a relay connected to the output of said current-control device and normally maintained in operated condition when the voltage across said second capacitor is above said predetermined level, said relay including switch contacts operable to energize said failure-indicating device whenever said relay drops out.

References Cited in the file of this patent

UNITED STATES PATENTS

| | | |
|---|---|---|
| 1,410,308 | Holt | Mar. 21, 1922 |
| 1,841,197 | Massonneau et al. | Jan. 12, 1932 |
| 1,989,965 | Beverage | Feb. 5, 1935 |
| 2,295,795 | Keeler | Sept. 15, 1942 |
| 2,542,192 | Handschin | Feb. 20, 1951 |
| 2,833,860 | Roberts et al. | May 6, 1958 |